US005555619A

United States Patent [19]
Maggio et al.

[11] Patent Number: 5,555,619
[45] Date of Patent: Sep. 17, 1996

[54] METHOD OF ELECTRICALLY CONNECTING A TRANSDUCER TO A PREAMPLIFIER

[75] Inventors: Mark Maggio, Bethany; Tom Metzner; Steven Eckerd, both of Oklahoma City; Loren Skarky, Bethany, all of Okla.; Yoshiki Midori, Edina, Minn.; Cal Hardie, Minneapolis, Minn.; Ray Yu, Bloomington, Minn.

[73] Assignee: Seagate Technology, Inc., Scotts Valley, Calif.

[21] Appl. No.: 457,266

[22] Filed: Jun. 1, 1995

Related U.S. Application Data

[62] Division of Ser. No. 230,392, Apr. 20, 1994.

[51] Int. Cl.⁶ ..................................... H01R 43/02
[52] U.S. Cl. .......................... 29/860; 360/97.01; 360/103; 437/220
[58] Field of Search .................... 360/103, 104, 360/97.01; 29/825, 860, 861; 437/209, 220

[56] References Cited

U.S. PATENT DOCUMENTS

| | | | |
|---|---|---|---|
| 4,371,744 | 2/1983 | Badet et al. | 361/410 |
| 5,055,969 | 10/1991 | Putnam | 361/398 |
| 5,121,273 | 6/1992 | Slezak | 360/104 X |

FOREIGN PATENT DOCUMENTS 62-245513  10/1987  Japan ................................. 360/103

*Primary Examiner*—Carl J. Arbes
*Attorney, Agent, or Firm*—Kinney & Lange, P.A.

[57] ABSTRACT

A transducer signal terminator for providing electrical connections between a plurality of read/write transducer lead wires and a preamplifier includes a substrate having a plurality of layers and has a plurality of intermediate strips. A plurality of head pads are located on the substrate to provide interconnection points. The intermediate strips have a plurality of electrically conductive pads with a hole therein, and each lead wire is electrically attached to a pad on the intermediate strip. Each intermediate strip is placed on the substrate such that each of the holes in the electrically conductive pads is aligned with one of the head pads on the substrate. An electrical connection is then formed between each head pad and a corresponding conductive pad of the intermediate strip.

15 Claims, 5 Drawing Sheets

METHOD OF ELECTRICALLY CONNECTING A TRANSDUCER TO A PREAMPLIFIER

This is a divisional of application Ser. No. 08/230,392, filed Apr. 20, 1994 and is assigned of record to Seagate Technology Inc. Priority of the prior application is claimed pursuant to 35 USC §120.

BACKGROUND OF THE INVENTION

The present invention concerns the electrical connection of the lead wires of a read/write transducer to a preamplifier circuit formed on a substrate and, more particularly, a method and apparatus for making that electrical connection. The invention involves terminating each of the lead wires onto pads of an intermediate strip, the position of each pad identifying the particular lead wires attached, and subsequently electrically connecting the intermediate strip pads to corresponding leads for the preamplifier circuit.

Typically in magnetic disc drives, signals from a read/write transducer are sent to a preamplifier circuit. The preamplifier circuit is generally located on an electrically insulating substrate. Previous disc drives use conventional coil (thin-film) read/write transducers, wherein the read signal is generated by the change in magnetic flux in a small coil located in the transducer. The transducer is positioned a minute distance above the surface of the recording medium or disc. The change in flux is caused by the motion of the underlying magnetic pattern on the disc surface. The same coil is also utilized by the transducer during the write process on the disc drive.

Generally two lead wires have been used to complete the electrical circuit to and from the terminals of the conventional coil transducer. The two lead wires are utilized to carry the electrical signal both in the read process and the write process, although the read signal is markedly different from the write signal. With a conventional coil transducer, the direction the signal runs (i.e., polarity of the terminals/lead wires) is unimportant, both in the read and the write process. Either lead wire can operate as the positive or negative lead. The two lead wires are not distinct from each other, and can be interchanged with one another without altering the performance of the system. The two lead wires have typically been encased in a single insulative or protective tubing running from the transducer to the pre-amplifier, with no mechanism to distinguish one wire from the other. Connection between the transducer terminals and the pre-amplifier circuit is generally performed by hand alignment and soldering of each transducer lead wire to one of two pads on the pre-amplifier circuit.

Recently, magneto-resister (MR) transducers have been utilized in disc drives. MR transducers generally continue to perform the write function with a coil in the transducer as described above. However, the MR read function is performed by a separate element in the transducer, a very tiny variable resistor. The variable resistor measures the magnetic flux placed on the resistor current due to the magnetism of the recording medium. Because separate elements are used for read and write functions, the MR transducer requires four terminals/lead wires rather than two. Additionally, in contrast to conventional coil transducers, MR transducers are generally sensitive to the direction or polarity of current flow. A reversal of current flow would disturb the domain alignment within the variable resister element, to the detriment of the MR transducer. Accordingly, the MR terminals/lead wires are designated as positive read, positive write, negative read and negative write, respectively. This polarity of MR transducer leads assures that the direction of current flow is non-reversible and in the direction intended.

The use of MR transducers having four polarized leads has created assembly problems in distinguishing each lead from the others. Wires are normally identified through coloring of the insulation layer surrounding the wire. However, this requires multiple spools of wire which increases the product cost. Additionally, when automation is desired for making the wiring connections, identification of wires through color coding becomes problematic. Not only must the changing operation between various spools of colored wire be automated, but the automated equipment must also have some sort of photo-sensitive eye or other sensing equipment to distinguish between wire colors. Accordingly, a better way to identify and distinguish between the lead wires of MR transducers is desired.

With the advent of MR transducers in disc drives, the read signal strengths have significantly decreased (in comparison to the read signal strengths on traditional coil transducers). To compensate for this lack of signal, low impedance preamps have been employed to improve the noise susceptibility. However, the signal line impedance between the transducer and the preamplifier becomes critical when applying low impedance preamplifiers. The preamplifier circuits for traditional coil transducers have generally been placed on a base board adjacent to the actuator arm. The signal line impedance of this traditional application would result in a significant reduction in band-width for a low impedance preamplifier. A second complication of MR signal line handling is the quantity of signal lies. The addition of two signal lines for MR transducers results in double the density of signal runs between the transducers and the preamplifier over traditional thin film transducer application. This increase in signal density provides a greater propensity for noise between signal lines ("interchannel noise"). To reduce the effects of bandwidth reduction and interchannel noise, it is desired to place the preamplifier as close to the transducers as possible.

In disc drives having MR transducers, the preamplifier assembly has been located on a rotary arm used to selectively position the transducer over the desired information storage track on the magnetic media on the disc. For a 3½ inch drive, the signal run length from the MR transducer to a pre-amplifier on the actuator arm is about 1½ to 1¾ inches, saving about 2 inches over placement of the pre-amplifier circuit on a baseboard. However, placement of the pre-amplifier circuit on the actuator arm has made for increasing difficult connection of the transducer leads to the pre-amplifier terminals.

In previous disc drives, the electrical connections between the read/write transducer lead wires and the preamplifier circuit are made by attaching the lead wires to spaced apart interconnection points or terminals on the preamplifier substrate, with the result that the connections are horizontally spaced in a single plane. In so attaching the lead wires, a minimum distance must be maintained between the positions of adjacent interconnection points to prevent shorting.

A problem that has consequently arisen is that the area remaining available on the pre-amplifier substrate for making the interconnection points for electrically connecting the transducer lead wires beyond that needed for the preamplifier circuit is continually decreasing. This is due in part to the use of smaller disc drives with correspondingly smaller rotary arms which have less room for the substrate thereon.

Further, the use of increasing numbers of magnetic storage discs in a single disc drive requires a greater number of transducers to be used and therefore increases the number of electrical connections that must be made on the substrate.

SUMMARY OF THE INVENTION

The present invention provides a transducer signal terminator for providing electrical connections between a plurality of read/write transducers and a preamplifier circuit. The signal terminator comprises a substrate having the preamplifier circuit formed thereon and further has a plurality of intermediate strips which are attached to the substrate.

The pre-amplifier substrate has a plurality of head pad sets mounted thereon. Each head pad set comprises four head pads which are used to electrically connect corresponding lead wires from one of the transducers to the preamplifier circuit.

Each intermediate strip comprises a conductive first layer, which is divided into four conductive pads, and an insulating second layer. In addition, each intermediate strip has four solder reflow holes therethrough. Each of the lead wires from a transducer is attached to a particular conductive pad and the intermediate strip is then positioned on one of the head pad sets such that each of the holes in the intermediate strip is aligned with one of the head pads in the head pad set. Each conductive pad is heated such that solder from the connected head pad melts and flows up through the solder reflow hole in the intermediate strip, forming an electrical path between each conductive pad and the corresponding head pad.

The intermediate strips also help prevent electrical shorting by providing insulation between adjacent head pad sets and by drawing solder from the head pads through the holes, thus preventing the solder from spilling onto adjacent head pads when the electrical connection is made.

DETAILED DESCRIPTION OF THE PREFERRED EMBODIMENTS

Figure 1:
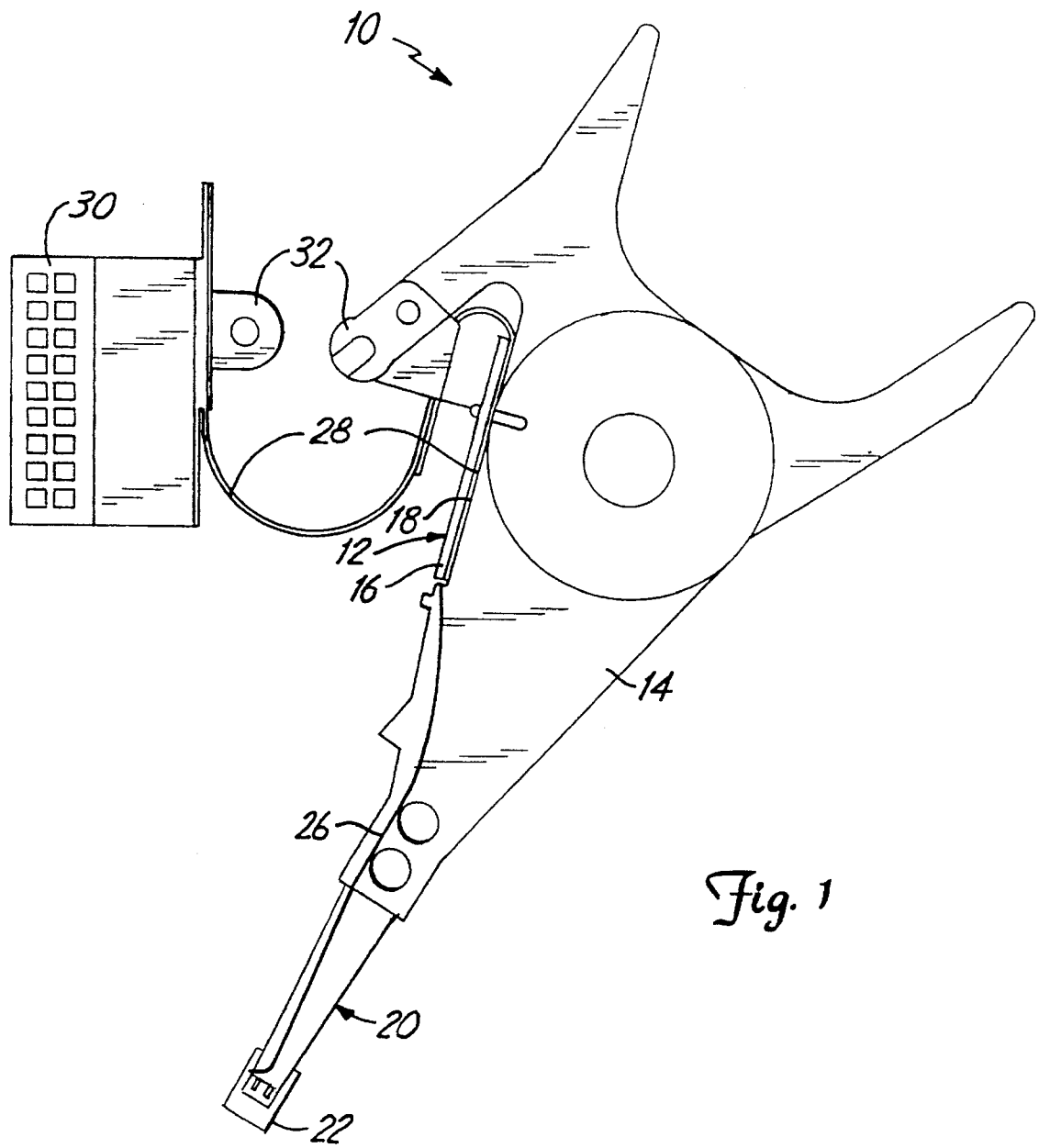
FIG. 1 is a schematic representation of a top view of a portion of a magnetic disc drive.

A portion of a disc drive 10 in which a transducer signal terminator 12 of the present invention is utilized is shown in FIG. 1. Disc drive 10 includes a rotary arm 14 and a co-fired ceramic substrate 16 attached to a first side 18 of rotary arm 14. A plurality of head spring assemblies 20, each including a read/write transducer 22, are attached to rotary arm 14. A bundle of four lead wires 26 extend from each transducer 22 to substrate 16. A flexible circuit 28 is attached to rotary arm 14 between substrate 16 and first side 18 and extends to a flex connector 30 which is spaced from rotary arm 14. Flexible circuit 28 is constrained in part by a pair of brackets 32 and provides a path for electrical signals between a preamplifier circuit located on substrate 16 and flex connector 30, which is electrically connected to signal processing circuitry (not shown).

Figure 2:
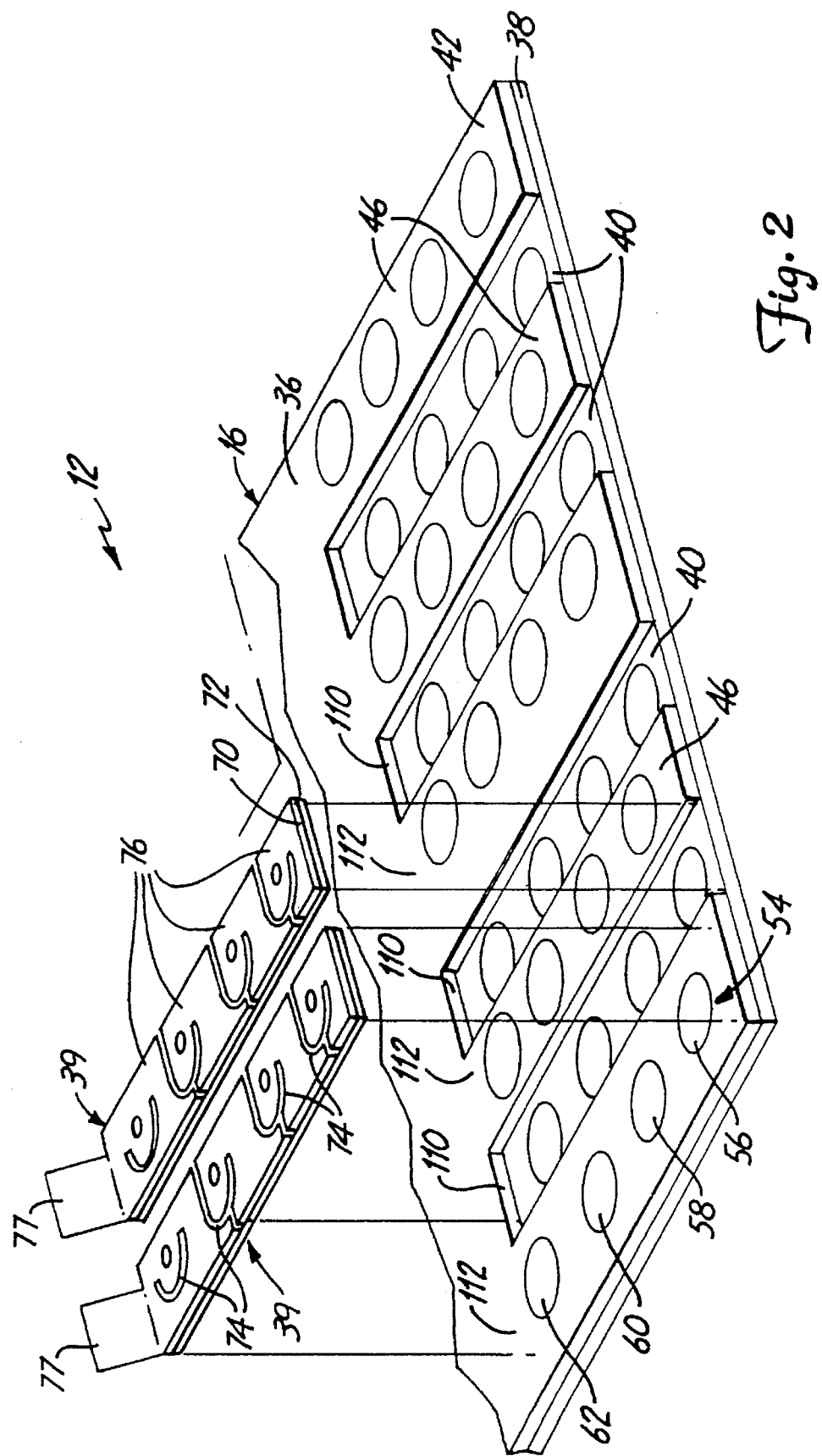
FIG. 2 is a perspective view of the transducer signal terminator of the present invention.

A portion of signal terminator 12 is shown in FIG. 2 and includes substrate 16, which has both a first layer 36 and a second layer 38, and further has nine intermediate circuit interconnection portions, or intermediate strips, 39. Both first layer 36 and second layer 38 of substrate 16 have an outer perimeter having the general shape of a rectangle. However, the shape of first layer 36 is modified to have a plurality of generally parallel rectangular slots 40 cut therein from a first end 42 to thereby leave a plurality of generally parallel rectangular fingers 46 that extend to first end 42 on either side of each slot 40. Both first and second layers 36 and 38 have a thickness generally between 6 and 9 mils.

Figure 3:
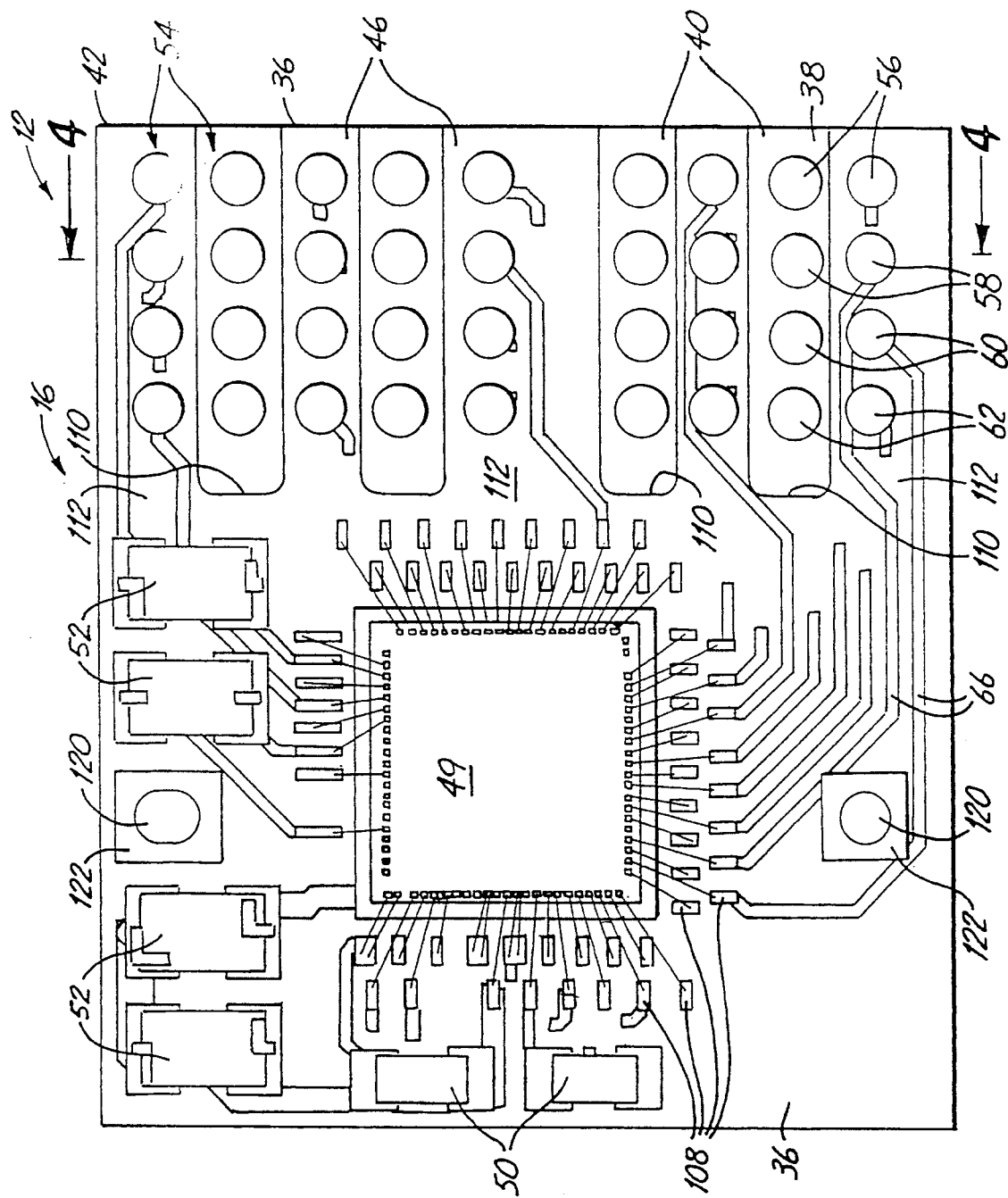
FIG. 3 is a schematic representation of a top view of a portion of the transducer signal terminator.

A preamplifier circuit comprising a monolithic integrated circuit die 49, a pair of surface mount resistors 50 and four surface mount capacitors 52 is located on first layer 36 of substrate 16 away from fingers 46 and is shown in FIG. 3. A plurality of head pad sets 54 are located on both first layer 36 and second layer 38 of substrate 16 and each includes a first head pad 56, a second head pad 58, a third head pad 60 and a fourth head pad 62. Head pads 56,58,60,62 may be 20–50 mil in diameter. Head pads 56,58,60,62 preferably comprise a solder bead attached over a copper base. Each of the head pads 56,58,60,62 are electrically connected to the preamplifier circuit via a plurality of electrically conductive interconnection runs 66, some of which extend between first and second layers 36 and 38 of substrate 16. Head pads 56,58,60,62 serve as terminals of the preamplifier circuit to receive electrical signals from transducer 22. The preamplifier circuit, which has a main preamplifier including a multiplexer, is also electrically connected to flexible circuit 28 by runs 66. Because each head pad set 54 includes four head pads 56,58,60,62, each set 54 provides an electrical connection to the preamplifier circuit for one of transducers 22. Therefore, it is necessary to provide a head pad set 54 on substrate 16 for each transducer 22 that is used in disc drive 10.

Figure 4:
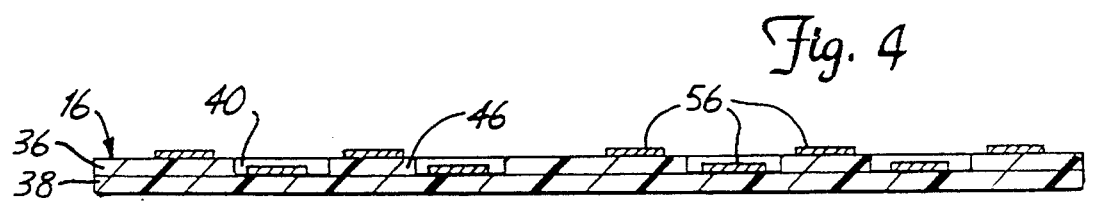
FIG. 4 is a sectional view of a portion of the transducer signal terminator taken along the line 4—4 of FIG. 3.

Second layer 38 of substrate 16 has four head pad sets 54 thereon which are positioned such that each set 54 is aligned with one of slots 40 in first layer 36. First layer 36 has five head pad sets 54 thereon, each of which is positioned on one of fingers 46. The placement of head pads 56,58,60,62 on both first layer 36 and second layer 38 of substrate 16 provides a vertical separation of about 8 mils between adjacent head pad sets 54 as can be seen in FIG. 4. This allows the horizontal distance between adjacent head pad sets 54 to be decreased without causing shorting between adjacent sets 54. This in turn allows a greater number of head pad sets 54 to be placed on substrate 16.

Figure 5:
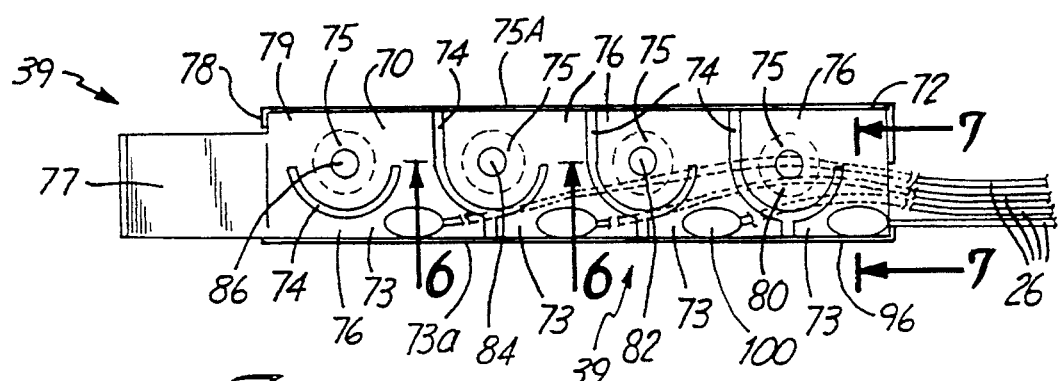
FIG. 5 is a schematic representation of a top view of an intermediate strip portion of the transducer signal terminator.
Figure 6:
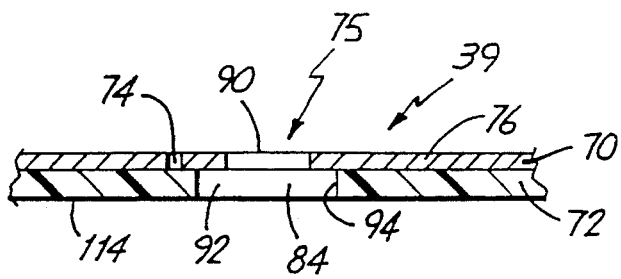
FIG. 6 is a sectional view of a portion of the intermediate strip portion taken atoll the line 6—6 of FIG. 5.

An intermediate strip 39 used in signal terminator 12 is shown in more detail in FIGS. 5 and 6. Intermediate strip 39 has both a conductive layer 70 which is fabricated from an electrical conductor, preferably copper, and an insulative layer 72 which is fabricated from an electrically insulating material such as ceramic or polyimide. Four grooves 74 are present in conductive layer 70, exposing insulative layer 72 and effectively serving as gaps or channels to separate conductive layer 70 into four separate pads 76. Insulative layer 72 thus provides the structure which supports and maintains the positional relationship of each of the four separate pads 76. As shown, three of the grooves 74 may be generally J-shaped, providing a partial gap between two discrete sections of each of the pads 76. J-shaped grooves 74 define lead connect sections 73 toward edge 73a of intermediate strip 39. J-shaped grooves 74 give these lead connect sections 73 a generally triangular shape. Lead connect sections 73 may be coated with solder plating (such as layers of gold and/or nickel) during manufacture of intermediate strip 39, so as to facilitate the subsequent connection between lead wires 26 and lead connect sections 73. J-shaped grooves 74 define head pad connect sections 75 toward edge 75a of intermediate strip 39. J-shaped grooves 74 give these head pad connect sections 75 a generally circular shape. J-shaped grooves 74 and head pad connect sections 75 should have a diameter at least as large as the diameter of their respective underlying head pad 56,58,60, 62. In this way, placement of intermediate strip 39 over head pad set 54 will cause each head pad 56,58,60,62 to contact one and only one head pad connect section 75.

Conductive layer 70 of each intermediate strip 39 is approximately 1.5 mils thick while insulative layer 72 is approximately 3.0 mils thick. Conductive layer 70 is held to insulative layer 72 by an adhesive. A second layer of a non-insulating material, such as ceramic or polyimide (not shown) may be applied over a substantial portion of conductive layer 70 to further aid in preventing shorting of pads 76.

A tab 77 extends from a first edge 78 of intermediate strip 39 at approximately a 45 degree angle to a top surface 79 of conductive layer 70. Tab 77 is designed to aid in the manual manipulation of intermediate strip 39. Tab 77 further aids in identifying the positional orientation of intermediate strip 39 (i.e., which end is which). Because electrical connection of transducer 22 to the pre-amplifier circuit is dependent on identifying the various lead wires 26 by the positional relationship of their lead connect sections 73, it is imperative that intermediate strip 39 not be installed in a reverse position, and tab 77 helps prevent reverse installation.

If the assembly process is automated, tab 77 may be designed and shaped as needed to aid in the automated fixturing for intermediate strip 39.

Tab 77 is preferably part of conductive layer 70, but could also be fabricated from insulative layer 72. Tab 77 may or may not be removable from intermediate strip 39 when strip 39 is finally placed in disc drive 10. Except for first edge 78, each edge of conductive layer 70 is set back or inwardly removed from the corresponding edge of insulative layer 72 by approximately 2 mils. This setback aids in avoiding shorting of each of the pads 76 along the edge of intermediate strip 39.

Figure 8:
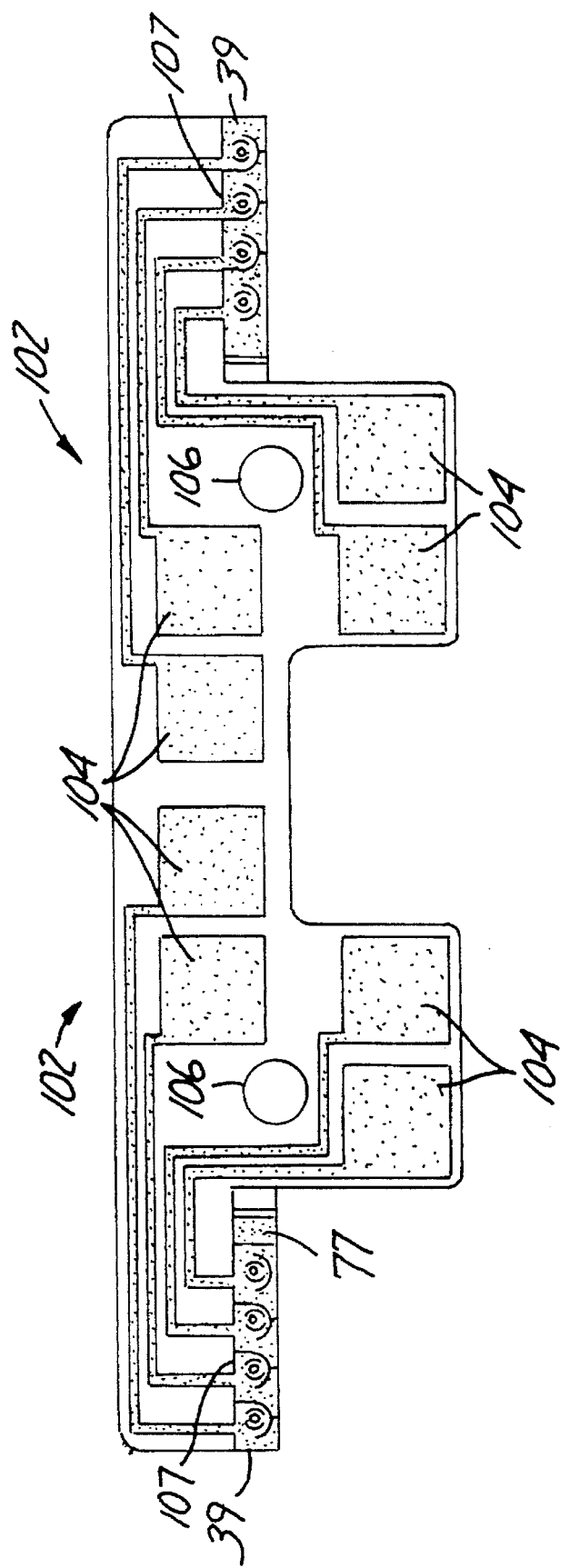
FIG. 8 is a top view of an alternative embodiment of an intermediate strip of the transducer signal terminator.

As an alternative embodiment, intermediate strip 39 may have a larger, removable test section 102, shown in FIG. 8. Test section 102 has terminals 104 electrically connected to each of the pads 76. As can be seen, terminals 104 are significantly larger than pads 76, and test section 102 aids in electrically connecting transducer 22 to a test circuit (not shown). In this way transducer 22 can be readily "fly-tested" (i.e., testing of the signals created as the transducer flies over a disc surface, perhaps including parametric testing such as amplitude and pulse width testing) prior to complete assembly of disc drive 10. After testing is completed, test section 102 may be removed from intermediate strip 39 by severing along separation line 107.

As shown, two or more intermediate strips 39 may be initially fabricated as a single unit, together with their respective test sections 102. Because the larger test terminals 104 would occupy too much space in the final disc drive 10, they are removed prior to electrical connection of intermediate strip 39 to head pad sets 54 and the pre-amplifier circuit. Test section 102 is formed out of the same insulative layer 72 of intermediate strip 39 (preferably 3.0 mil thick KAPTON, a flexible polyimide material from DuPont), and test terminals 104 are formed out of the conductive layer 70 (preferably 1.5 mil thick copper). Similar to tab 77, test sections 102 may be designed and shaped as needed to aid in the automated fixturing for intermediate strip 39, such as by holes 106.

As shown in FIGS. 5 and 6, first cavity 80, a second cavity 82, a third cavity 84 and a fourth cavity 86 extend through intermediate strip 39. Each of cavities 80,82,84,86 comprises a generally cylindrical first hole 90 in conductive layer 70 and a generally cylindrical second hole 92 in insulative layer 72. Each first hole 90 is centered about the same axis as the corresponding second hole 92 and has a diameter of approximately 8–10 mils. Second hole 92 has a diameter of approximately 20–30 mils and has an inner surface 94 which is plated with solder. First holes 90, as well as grooves 74, are preferably formed by etching while second holes 92 are preferably formed through the use of a mechanical punch or a laser. Cavities 80,82,84,86 and corresponding head pad connect sections 75 can be linearly arranged on intermediate strip 39. As shown, head pad connect sections 75 are offset both linearly (i.e., not in the same line as) and transversely (i.e., not directly underneath) from lead connect sections 73. This offset provides better separation of head pad connect sections 75 and lead connect sections 73, while still maintaining electrical continuity.

The electrical connection of transducers 22 to the pre-amplifier will now be described. First, lead wires 26 from transducer 22 are electrically connected to intermediate strip 39 as shown in FIG. 5. Preferred lead wires 26 are about 1.5 mil in diameter, made from a single strand of copper wire coated with 1 to 4 layers of polyurethane or nylon insulation. The insulation layers are only a few tenths of a nail thick, and may be transparent or translucent. Because lead wires 26 will be identified by the pad 76 to which they are attached, it is not necessary that the insulation layer be colored.

A first lead wire 26 is electrically connected to a first pad 76 on the top side of that pad's lead connect section 73. This connection may be made through any known means, but soldering or ultrasonic or stitch welding is preferred. The connection of first lead wire 26 orients lead wire 26 such that it generally runs longitudinally along intermediate strip 39. When disc drive 10 is fully assembled, this orientation of lead wires 26 helps to avoid contact and/or confusion between lead wires 26 from adjacent intermediate strips 39. After attachment to lead connect section 73 of the first pad 76, the first lead wire 26 is attached to the corresponding terminal (say, for example, the negative write terminal) on transducer 22. This attachment is again preferably made through ultrasonic or stitch welding. Using our example, the first pad 76 with first cavity 80 is thus defined as the negative write pad 76 on the intermediate strip 39.

After the first (negative write) lead wire 26 is electrically connected both to its lead connect section 73 and its transducer terminal, each subsequent lead wire 26 (positive write, negative MR read and positive MR read) is similarly connected. Because both ends of each lead wire 26 are attached prior to introduction of additional lead wires 26, there is no opportunity for confusion over the polarity of any particular lead wire 26, and lead wires 26 are identified by the particular pad 76 to which they are attached.

Workers skilled in the art will recognize that the particular order of polarities and order of connections is not important so long as each transducer terminal can be identified by the location of the attached pad 76. Similarly, workers skilled in the art will appreciate that pads 76 need not be arranged linearly, and for instance could be arranged in a rectangular fashion, so long as intermediate strip 39 identifies discrete locations associated with each particular lead wire 26 of transducer 22.

Figure 7:
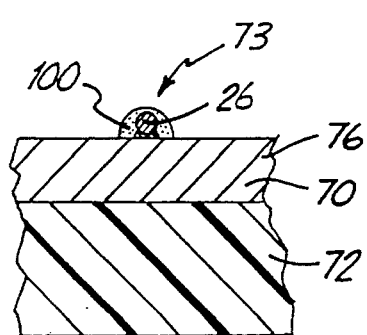
FIG. 7 is a sectional view of a portion of the intermediate strip portion taken along the line 7—7 of FIG. 5.

FIG. 5 depicts intermediate strip 39 after all four lead wires 26 have been connected. Lead wires 26 are shown in dashed line form over a portion of intermediate strip 39 to avoid obscuring the view of intermediate strip 39. A thin layer of an encapsulant 100 is preferably placed over the connection between each lead wire 26 and corresponding pad 76 as shown in FIGS. 5 and 7. Encapsulant 100 may be an adhesive or other substance which helps to provide strain relief and absorb the physical stresses that may be placed on lead wires 26, thereby helping to preserve the connection between each lead wire 26 and copper pad 76. Encapsulant 100 also helps to captivate any loose flakes of insulation caused by the soldering or welding of lead wire 26. The epoxy may be cured through application of ultraviolet light in a matter of a few seconds. Grooves 74 act as a barrier or moat to prevent encapsulant 100 from flowing into cavities 80,82,84,86. Having lead connect sections 73 offset both linearly and transversely from head pad connect sections 75 further aids in preventing encapsulant 100 from flowing into cavities 80,82,84,86.

After all lead wires 26 are attached between intermediate strip 39 and the terminals of transducer 22, wires 26 are preferably twisted into a bundle. The twisting of wires 26 terminates approximately a quarter inch away from both transducer 22 and intermediate strip 39, thus allowing separation of wires 26 for their respective attachments. A bundle of lead wires 26 is easier to work with than individual lead wires 26. As shown in FIG. 1, the bundle runs down rotary arm 14 and head spring assembly 20 to transducer 22. The bundle is preferably held in place on rotary arm 14 and head spring assembly 20 by several drops of glue placed at spaced locations along the wire bundle.

After intermediate strip 39 is fully connected to transducer 22, intermediate strip 39 is positioned on the appropriate head pad set 54 such that first end 78 of intermediate strip 39 faces an inner end 110 of slot 40 or an inner end 112 of finger 46 as shown in FIGS. 2 and 3. Intermediate strips 39 are positioned likewise for each transducer 22. When intermediate strips 39 are so positioned, each one of first, second, third and fourth cavities 80,82,84,86 is aligned with a corresponding one of first, second, third and fourth head pads 56,58,60,62, respectively, and a bottom side 114 of insulative layer 72 contacts substrate 16. Because head pads 56,58,60,62 are larger in diameter than the corresponding holes 90, some tolerance in placement of intermediate strip 39 is provided while still aligning cavities 0,82,84,86 over head pads 56,58,60,62 for electrical connection. Similarly, head pads 56,58,60,62 may be horizontally elongated (not shown) to provide tolerance for the length of lead wires 26.

Intermediate strips 39 are preferably attached to substrate 16 by heating each pad 76. The heat melts the solder plated on inner surface 94 of each corresponding second hole 92, as well as the solder of the corresponding one of head pads 56,58,60,62. The solder may be drawn up through each of cavities 80,82,84,86 to form an electrical connection between each pad 76 and corresponding one of head pads 56,58,60,62. The melting of the solder forms a bond holding intermediate strip 39 in place on substrate 16. A solder bead may form on the exterior of hole 90, thus forming a solder rivet to further hold intermediate strip 39 to substrate 16. By drawing the solder from head pads 56,58,60,62 up through each of cavities 80,82,84,86, the solder is prevented from flowing between intermediate strip 39 and substrate 16 when melted. This helps to prevent shorts between adjacent head pads 56,58,60,62 and between adjacent head pad sets 54. The dimensions of cavities 80,82,84,86 will greatly affect the amount of solder that is drawn therethrough. The intermediate strips 39 may alternatively be electrically and physically attached to head pad sets 54 by other known means, such as ultrasonic or stitch welding. A secondary method of retaining intermediate strip 39 against substrate 16 may also be used, particularly if a method of electrical connection other than soldering is employed.

An encapsulant is placed on first layer 36 of substrate 16 to cover die 49 and a plurality of die bonds 108, shown in FIG. 3. The encapsulant preferably comprises HYSOL 4401 but can also comprise a variety of other materials. Substrate 16 is held in place on rotary arm 14 through the use of two pins 120 which are attached to rotary arm 14 and extend through substrate 16 and through openings in connection pads 122. Pins 120 are then soldered in place, holding substrate 16 on first side 18 of rotary arm 14.

By providing vertical separation between adjacent head pad sets 54, the distance between head pad sets 54 is increased over the previous practice of having interconnection points horizontally spaced in a single plane, helping to prevent electrical shorts between adjacent head pad sets 54. Intermediate strips 39 also help to prevent electrical shorts between adjacent head pad sets 54 through the use of non-conductive insulative layer 72. In addition, intermediate strips 39 help to prevent electrical shorts between adjacent head pad sets 54 by drawing solder up from head pads 56,58,60,62 through cavities 80,82,84,86. Each of these factors permits a greater member of head pad sets 54 to be placed on substrate 16 and thus permits a greater number of electrical connections to be made between the preamplifier circuit and transducer lead wires 26.

The use of vertically separated substrate layers 36 and 38, along with the use of slots 40 also helps to align transducer lead wires 26 with respect to substrate 16. The use of intermediate strips 39 allows the electrical connections between transducers 22 and the preamplifier circuit to be made more easily. This is because lead wires 26 are first attached to each intermediate strip 39 which can then more easily be attached to substrate 16 than if lead wires 26 are directly connected to head pad sets 54. Although described as having two layers on which heads pads sets 54 are located, substrate 16 can have additional layers on which head pad sets 54 may be located. While nine head pad sets 54 were described as having four head pads 56,58,60,62 each, any number of head pad sets 54 can be placed on substrate 16 subject only to the physical limitations of substrate 16. Further, head pad sets 54 can have any number of head pads therein and can be arranged in any of a variety of configurations.

While substrate 16 was described as having a first layer 36 and a second layer 38 only, substrate 16 can have a plurality of additional layers as well. These layers can be used not only to provide further vertical spacing between head pad sets 54, but can be used to provide more runs 66 between head pads 56,58,60,62 and the preamplifier circuit.

Although the present invention has been described with reference to preferred embodiments, workers skilled in the art will recognize that changes may be made in form and detail without departing from the spirit and scope of the invention. For instance, several of the features herein described may be omitted or altered while not departing from the invention claimed.

What is claimed is:

1. A method for electrically connecting a transducer to a pre-amplifier in a computer disc drive, the method comprising:

electrically connecting a first electrically conductive pad on an intermediate strip to a first distinct terminal of the transducer;

electrically connecting a second electrically conductive pad on the intermediate strip to a second distinct terminal of the transducer, wherein the location of the first and second electrically conductive pads designates the transducer terminal connected thereto; and positioning the intermediate strip such that the first electrically conductive pad makes electrical contact to a first corresponding terminal of the pre-amplifier and the second electrically conductive pad makes electrical contact to a second corresponding terminal of the pre-amplifier.

2. The method of claim 2 wherein the step of electrically connecting the first electrically conductive pad comprises:

ultrasonically welding a lead wire to the first electrically conductive pad.

3. The method of claim 1 wherein the step of electrically connecting the first electrically conductive pad comprises:

soldering a lead wire to the first electrically conductive pad.

4. The method of claim 1 further comprising:

covering a connection of a lead wire on the first electrically conductive pad with an encapsulating epoxy.

5. The method of claim 4 further comprising:

curing the encapsulating epoxy by exposure to ultraviolet light.

6. The method of claim 1 wherein the step of positioning the intermediate strip comprises:

ultrasonically welding the electrically conductive pad to a terminal of the pre-amplifier circuit.

7. The method of claim 1 wherein the step of positioning the intermediate strip comprises:

soldering the electrically conductive pad to a terminal of the pre-amplifier circuit.

8. The method of claim 1 wherein the electrical connection of the first electrically conductive pad to the first distinct terminal of the transducer is through a first wire and wherein the electrical connection of the second electrically conductive pad to the second distinct terminal of the transducer is through a second wire, the method further comprising:

twisting the first wire and the second wire into a bundle.

9. The method of claim 8 further comprising:

attaching the bundle to an actuator arm which carries the transducer in the computer disc drive.

10. The method of claim 1, further comprising the step of:

testing the transducer via test terminals electrically connected to the electrically conductive pacts.

11. The method of claim 10, further comprising the step of:

removing the test terminals from the electrically conductive pads prior to positioning of the intermediate strip.

12. The method of claim 1, wherein the electrically connecting steps occur before the positioning step.

13. The method of claim 1 wherein the intermediate strip has opposing first and second sides, wherein the electrically connecting of the first and second distinct terminals occurs on the first side of the intermediate strip, and wherein the positioning step makes electrical contact against the second side of the intermediate strip.

14. The method of claim 1 further comprising the steps of:

securing the electrical connection between the first electrically conductive pad and the first corresponding terminal of the pre-amplifier; and securing the electrical connection between the second electrically conductive pad and the second corresponding terminal of the pre-amplifier.

15. The method of claim 14 wherein the securing steps comprise:

soldering the first electrically conductive pad to the first corresponding terminal of the pre-amplifier; and soldering the second electrically conductive pad to the second corresponding terminal of the pre-amplifier;

thereby mounting the intermediate strip with respect to the pre-amplifier.

* * * * *

UNITED STATES PATENT AND TRADEMARK OFFICE
CERTIFICATE OF CORRECTION

PATENT NO. : 5,555,619
DATED : SEPTEMBER 17, 1996
INVENTOR(S) : MARK MAGGIO, TOM METZNER, STEVEN ECKERD, LOREN SHARKY, YOSHIKI MIDORI, CAL HARDIE, RAY YU it is certified that error appears in the above-indentified patent and that said Letters Patent is hereby corrected as shown below:

Col. 2, line 32, delete "lies", insert --lines--

Col. 6, ine 39, delete "nail", insert --mil--

Col. 7, line 55, after "cavities", delete "0", insert --80--

Col. 8, line 36, delete "member", insert --number--

Col. 9, line 23, after "claim", delete "2", insert --1--

Signed and Sealed this

Fourteenth Day of January, 1997

Attest:

BRUCE LEHMAN

*Attesting Officer*        *Commissioner of Patents and Trademarks*